Dec. 1, 1959  J. F. ARMSTRONG ET AL  2,915,049
RAM TUBE MANIFOLD FOR FUEL INJECTION SYSTEM
Filed April 1, 1957  3 Sheets-Sheet 1

INVENTOR.
JAMES FRED ARMSTRONG
RALPH E. KALERT JR.
BY
*Bertram H. Mann*
ATTORNEY Dec. 1, 1959   J. F. ARMSTRONG ET AL   2,915,049
RAM TUBE MANIFOLD FOR FUEL INJECTION SYSTEM
Filed April 1, 1957   3 Sheets-Sheet 3

INVENTOR.
JAMES FRED ARMSTRONG
RALPH E. KALERT JR.
BY
*Bertram H. Mann*
ATTORNEY ing the fuel distribution function by dividing the fuel equally between separate passages leading to separate fuel nozzles for each of the individual cylinders.

United States Patent Office 2,915,049
Patented Dec. 1, 1959

2,915,049

RAM TUBE MANIFOLD FOR FUEL INJECTION SYSTEM

James F. Armstrong, St. Louis, Mo., and Ralph E. Kalert, Jr., Granite City, Ill., assignors to ACF Industries, Incorporated, New York, N.Y., a corporation of New Jersey Application April 1, 1957, Serial No. 649,708

17 Claims. (Cl. 123—52)

This invention relates to an air induction system for piston engines of the type having single or multiple rows of cylinders. This invention is especially adapted for use with a separate fuel system which meters the required amount of fuel for each engine condition of operation, and also performs the fuel distribution function by dividing the fuel equally between separate passages leading to separate fuel nozzles for each of the individual cylinders.

The distributing function performed separately by the fuel system is a former function of the intake manifold and its branches in the conventional carburetor and manifold combination. These combined functions caused difficult compromises in design.

Where the engine air induction manifold is not utilized to distribute fuel, changes are permitted to take full advantage of engine intake pulsations and the effect of these pulsations on dynamic air flow to obtain the best possible results in charging each of the cylinders with air to its maximum capacity.

An engine manifold for handling air only may have a common inlet, header, and branches arranged so that the individual air branches of the manifold more fully utilize the ram effect produced by tuning the frequency (length and cross-sectional area) of each ram tube to intake valve timing within a chosen range of engine speeds.

According to this invention, the air induction system is an engine intake manifold comprising a main air passage or header located between the parallel rows of cylinders below the valve covers. The header has a series of branches, which may be referred to as ram tubes, connected at one end with the intake ports of the cylinders and open at the opposite end within the header.

It is one of the objects of this invention to provide an intake manifold with branches for each cylinder intake port of equal length.

It is another object of this invention to provide an intake manifold having a plurality of branches so disposed with respect to one another as to reduce the height of the manifold but increase the length of the branches, so that the entire manifold is below the plane of the valve covers of the engine.

It is also an object of this invention to provide an intake manifold which is compact, low in height, and is constructed in such a manner as to properly position and accommodate a plurality of fuel nozzles, one for each branch of the manifold.

It is also an object of this invention to provide a compact ram tube type manifold which may be cast in a single piece if desired.

Further objects and advantages of this invention will appear from the detailed description of the structure illustrated in the accompanying drawings, in which.

The invention is described as applied to one form of piston engine having opposite banks of cylinders. In this instance, the engine illustrated is one of the current V–8 engines used by passenger car makers for powering both trucks and passenger automobiles. It is contemplated, however, that the same principles applied here as illustrated can be followed with any engine having one or more banks of cylinders.

Figure 1:
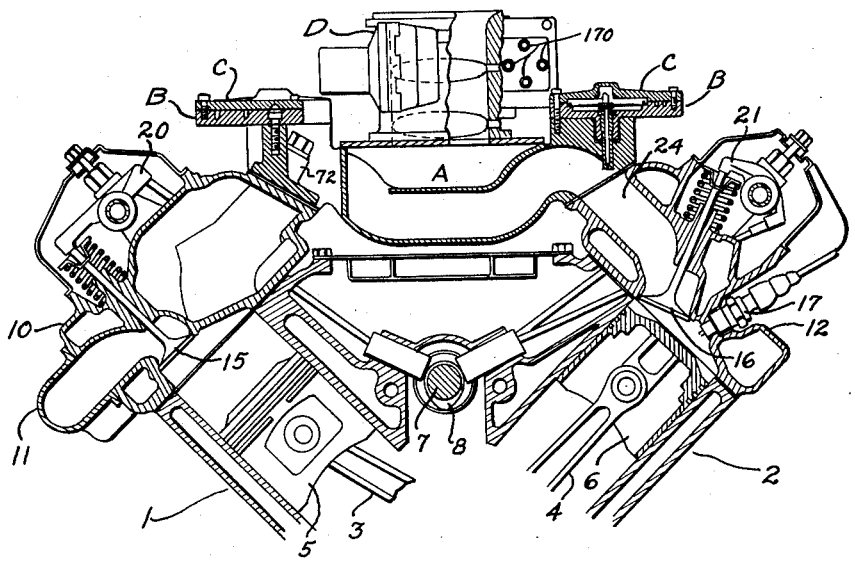
Fig. 1 is a transverse vertical section taken on a line extending through the cylinders in opposite banks of a conventional V–8 engine.

It is the usual practice in V-8 engine design to cast both banks of cylinders within a single cylinder block such as illustrated in Fig. 1 of the drawings. In this view, one cylinder in each bank of four cylinders is illustrated in section. The left bank is illustrated as 1, and the right bank as 2. In this type of engine, one bank (in this case the right bank) is slightly offset ahead of the other so that the connecting rods 3 and 4 in opposite cylinders may be journaled on a single crank throw of the crankshaft (not shown) in side-by-side relation. Each connecting rod 3 and 4 carries a piston 5 and 6 for driving the crankshaft, which shaft in turn, by suitable gearing, rotates a camshaft 7 having a plurality of cam lobes 8, one for actuating each intake and each exhaust valve.

The cylinder bank 1 has a cylinder head 10 to which is connected an exhaust manifold 11. Likewise, the cylinder bank 2 has a cylinder head 12 to which is connected a second exhaust manifold (not shown).

Within the cylinder heads 10 and 12 are a plurality of intake and exhaust valves. Because of the manner in which the section is taken through the engine, only one exhaust and one intake valve are shown, one in each of the cylinders in opposite banks. In the left bank is an exhaust valve 15, while in the right bank the valve 16 is an intake valve. The right bank illustrates the position of the spark plug 17 in the engine cylinder.

Each intake valve 16 in each of the cylinders, and each exhaust valve 15 in each of the cylinders, is operated from the camshaft 7 by suitable valve gear such as 20 and 21. Each intake valve controls an inlet port such as 24 illustrated in the right bank only, to which each branch of the intake manifold to be described is connected.

The foregoing description relates to engine structure which, in itself, forms no part of the present invention. A further detailed description does not appear necessary for a full understanding of the present invention.

The induction system, according to this invention, comprises several distinct members which are attached together. For purposes of convenience in illustration and description, these parts are separately designated. A indicates the intake manifold, which comprises a header and a plurality of branches, all to be hereinafter described. Secured to the manifold are a pair of oppositely located castings forming nozzle cluster holders B. Each nozzle holder cluster B mounts a plurality of diaphragms for controlling the fuel nozzles, which are in turn enclosed by cap clusters C removably secured on the nozzle clusters B. The manifold A has an air inlet to which is secured an air horn D containing a throttle which is manually controlled, and means for measuring air and fuel. The fuel system, air horn D, and the individual fuel nozzles herein, are identical with those corresponding elements shown in the patent to Armstrong No. 2,785,669 of March 19, 1957, for "Injection Carburetion."

Air induction system

Figure 2:
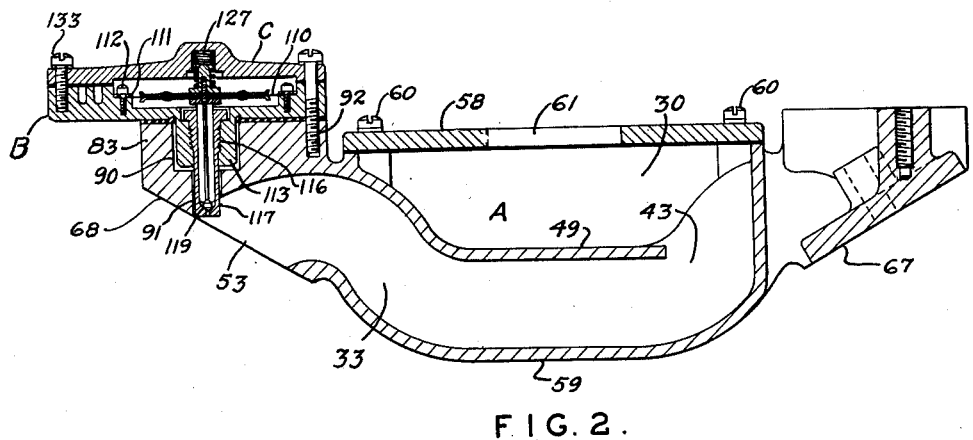
Fig. 2 is a transverse vertical section showing the manifold on an enlarged scale.
Figure 3:
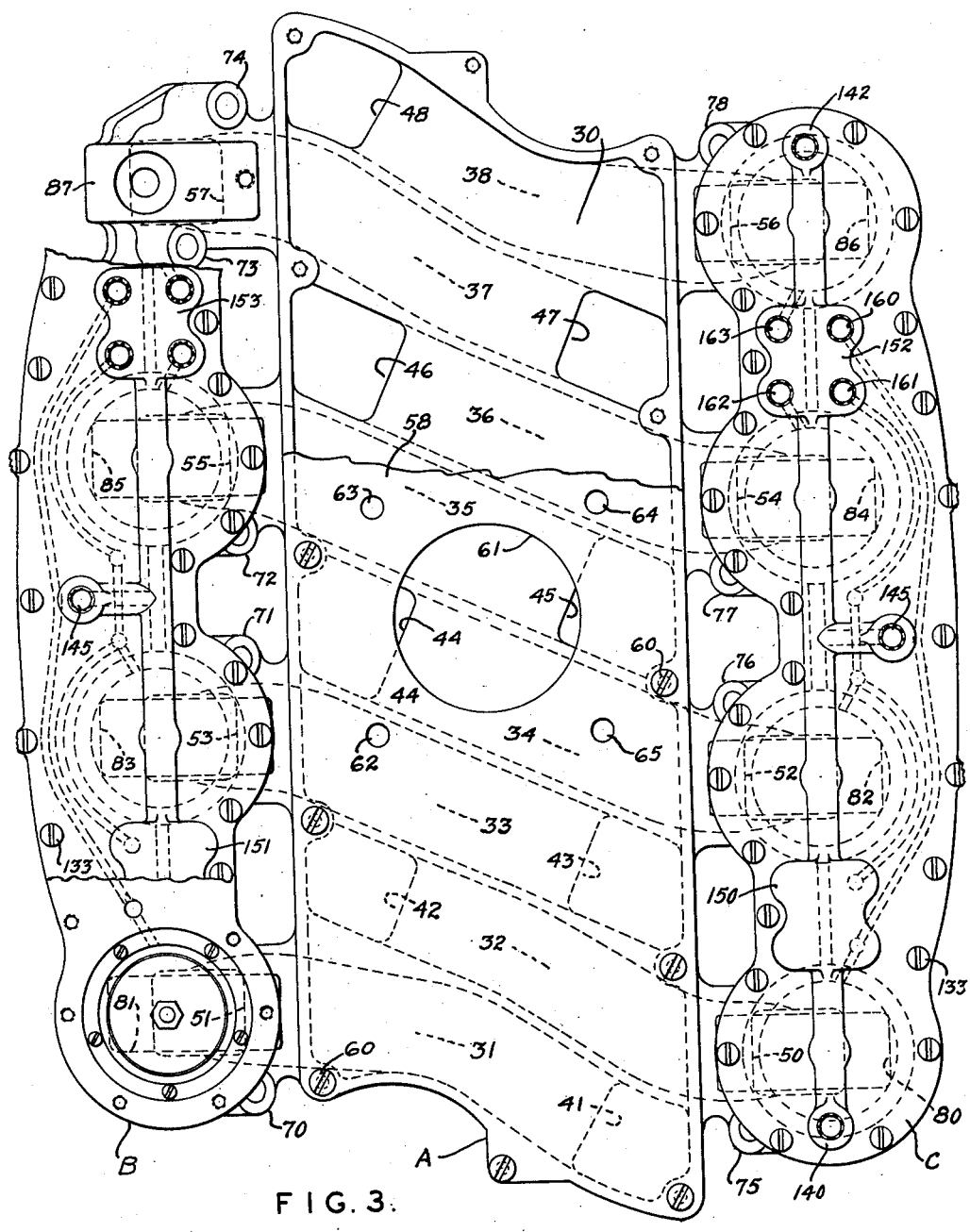
Fig. 3 is a top plan view of the manifold showing the nozzles assembled therewith with parts broken away to illustrate the construction.

Figs. 2 and 3 best illustrate the manifold A.

Preferably, the manifold A is a single casting with a main chamber 30 common to and communicating with all of the branches of the manifold. Each branch is indicated by the reference characters 31 through 38, inclusive. Branches 31, 33, 35 and 37, which lead to the left bank of cylinders, have inlet openings 41, 43, 45 and 47 communicating with the header 30 and connected, in turn, to outlets 51, 53, 55, and 57 located so as to be directly connected with the intake ports in the left bank of cylinders 1. Branches 32, 34, 36, and 38 have inlets 42, 44, 46 and 48 communicating with the header portion of the manifold 30, and outlets 50, 52, 54, and 56 which register with the intake ports 24 in the right-hand bank of cylinders 2. The bottom of the manifold has a continuous wall or floor 59 constituting one side of each of the branches 31 and 38. Thus, all of the branches lie along the floor of the manifold and open vertically through the inlets 41 to 48, inclusive. A continuous wall 49 spaced from the floor 59 of the manifold constitutes the common top wall for all of the branches 31 to 38, inclusive. Partitions between the wall 49 and floor 59 separate the manifold branches.

The header 30 of the manifold A is enclosed by a cover plate 58 secured in place by a plurality of cap screws 60. A central opening 61 registers with the air horn D which is secured thereto by studs engaging the air horn D and threaded into suitable spaced apertures 62 to 65, inclusive. At the outlets of each of the branches, the manifold casting is faced off at 67 and 68 on an angle so as to match with the surfaces on the cylinder head, and each branch has a suitably bored boss 70 to 78 (some of which are shown) for receiving studs to secure the manifold against the cylinder head. It will be understood that it is conventional practice to insert a ported gasket between the cylinder head and the outlets of the manifold to insure against leakage.

With the intake manifold secured in place, the passage of air is from the inlet 61 in the cover plate 58 into the header chamber 30. From the description so far, it is apparent that there is nothing impeding the flow of air in any direction within the chamber 30, since the flow therein is between plain, unobstructed walls both at the top and at the bottom. Free passage of the air is assured to each of the inlets 41 to 48 of the ram tubes 31 to 38, inclusive. As each intake valve opens, air will enter each of the ram tube inlets 41 to 48, which, in this case, are at least equal in area to the cross-section of each of the ram tubes 31 to 38, so that the flow into the ram tubes is relatively unobstructed. The ram tubes themselves are shown as equal in cross-sectional area to each of the ram tube outlets 50 through 57, inclusive, so that in flow capacity the ram tubes are uniform from inlet to outlet. This is the present preferred construction for each of the ram tubes, but, if desired, this structure is perfectly capable of being modified. The tubes 31 to 38 may be tapered so that variations in cross-section resemble a venturi.

In the illustrations, the inlet to the manifold 61 has been centrally located, but it is obvious that the arrangement does not require a symmetrical location.

Fuel nozzle mounting

As will be noted with reference to Fig. 2, each of the ram tube branches 31 to 38 projects beyond the header 30, and this projecting part has flanged, angularly arranged surfaces 67 and 68 which meet with the surfaces on the cylinder head. Opposite the surfaces 67 and 68, the branches are formed with an upwardly facing rectangular boss indicated herein by the reference characters 80 through 87, inclusive. Since all of these bosses on each branch end are exactly the same, only one will be described. Fig. 2 is the best illustration of this construction, and in this view the boss 83 is shown with a vertical passage 91 counter-bored at 90. Passage 91 extends from the upper surface of the boss into the ram tube. Each boss also has a tapped hole 92, and this forms means for securing the cluster of nozzle holders B enclosed by a cluster of nozzle caps C.

Nozzle holder clusters

Figure 4:
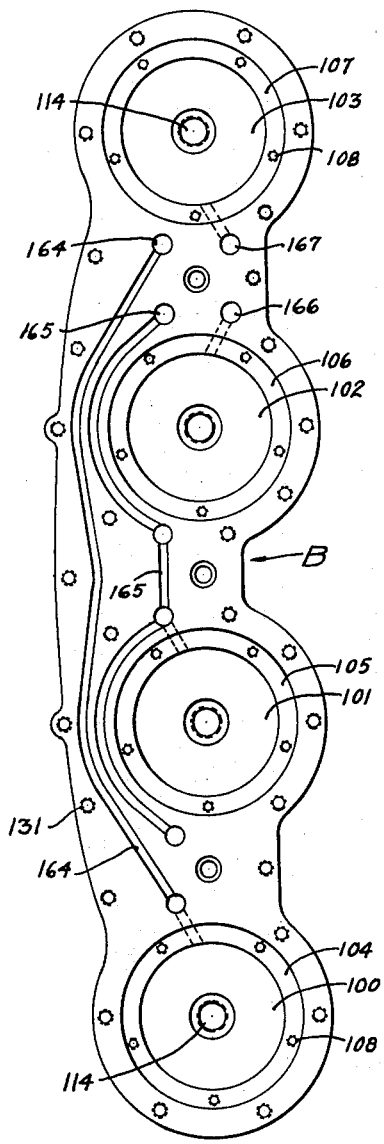
Fig. 4 is a top plan view of one of the castings which attaches to the manifold for forming a support for a plurality of nozzles.

Fig. 4 shows a top view of one of the nozzle clusters, and this view taken with that in Fig. 2 will serve to illustrate these parts. Since each of the nozzle clusters is identical, only one will be described.

The nozzle cluster B is preferably an aluminum casting with chambers 100 to 103. These chambers are counterbored for forming surrounding flanges 104 to 107. Tapped holes 108 in the flanges 104 to 107 are provided for the nozzle diaphragms 110, which are secured therein at their periphery by clamping rings 111 and screws 112.

The lower surface of each nozzle cluster has a series of four bosses 113, all of which are alike, and all of which are centrally located with respect to the chambers 100 to 103. These nozzle bosses are bored at 114 and tapped at their upper ends at 116 to receive the threaded nozzle stems 117. Each stem has a slidable nozzle valve 119 operating on a valve seat in response to movements of the diaphragm 110, which is attached at its upper end, all in a manner disclosed in the prior patent to Armstrong, above mentioned, and a co-pending application of Armstrong, Serial No. 646,063, filed March 14, 1957, for "Nozzle for Fuel Injector System."

Figure 5:
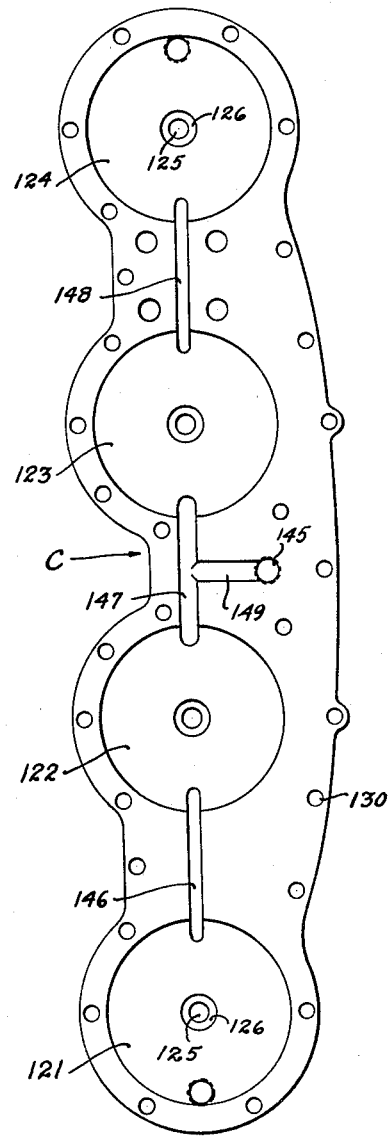
Fig. 5 is a bottom plan view of the casting forming the cover for enclosing the fuel nozzle assemblies.

Each of the chambers 100 to 103 is enclosed by a cap cluster, a bottom view of which is shown in Fig. 5.

Cap cluster

The cap cluster C is preferably an aluminum casting complementary in outline to the nozzle cluster B, and includes a plurality of chambers 121 to 124 registering with chambers 101 to 103. These chambers are centrally bored and countedbored at 125 and 126, respectively, to form a seat for a spring 127 acting downwardly on each of the valve stems to seat the nozzle valves 119. The outer periphery of the cap cluster C is preferably formed with spaced holes 130 matching with those in the nozzle cluster 131, so that when the nozzle cap cluster is placed on top of the nozzle cluster, the two may be secured by a plurality of cap screws 133 as illustrated in Figs. 2 and 3.

Figs. 2 and 3 show the cap cluster C in assembled position on the nozzle cluster B and both mounted in position on the manifold A. Each cap cluster has a plurality of tapped bosses for connection with fittings for suitable lines connecting with the fuel metering device in air horn D. The tapped bosses 140 to 143, two of which are shown, in the right bank assembly, connect with the chambers 121 to 124 through suitable passages 146, 147, and 148. These are the datum pressure connections as described in the prior patented system, and form part of the datum circuit to control each of the nozzles 117 in a manner described heretofore in the patent to Armstrong. The cap clusters may also have tapped inlets 145 connecting by passages 149 with the datum chambers 121 to 124, inclusive. This provides three connections in each cap cluster for circulation of fuel at predetermined datum pressures. These alternative nozzle connections for datum pressure make possible a plurality of circuits; for example, datum pressures may be supplied through the connection 142 and the fuel pass through each of the chambers 121 to 124 to the connection 140, which in turn may be interconnected by a tube with the corresponding connection 141 (not shown) in the cap cluster on the left bank. Fuel may then be discharged through the boss 143 (not shown) on the cap cluster of the left bank to the datum pressure regulator and fuel tank return line. In this instance, the connections 145 would not be utilized, and therefore not bored and tapped. However, these six connections provide different circuits, some of which may be more desirable on one engine than on another.

Each of the cap clusters has a pair of bosses 150 and 152 which are cloverleaf in outline. Either one of these bosses, whichever is convenient, may have four tapped connections 160 to 163, which in turn communicate individually and separately with chambers 100 to 103, respectively, by way of suitable passages 164 to 167, respectively. These connections form the individual fuel supply to each of the nozzles 117. It will be understood from the disclosure in the prior Armstrong patent that the several connections 160 to 163 will be supplied with fuel in individual, metered, equal amounts from the air horn device D which has eight separate connections 170 for this purpose.

Operation

From the foregoing, it will appear that two separate systems, one for air and one for fuel, are provided by this construction. The air system is more compact and can have tuned branches of nearly twice the length of those in the conventional V–8 engine manifold, which means that the amplitude and the effect of the pulsations on engine charging can be doubled. This is accomplished by a structure with a silhouette completely below the plane of the valve covers of the engine. Full advantage of this feature can be taken by mounting the air horn and fuel metering part D beside the engine and connecting the outlet therefrom to the inlet 61 of the manifold by a tube or the like. There is no compelling reason why the air horn D must be mounted centrally of the manifold as shown.

The fuel system is totally enclosed within four castings mounted on the manifold, and is so designed that all exterior connections are conveniently placed to provide alternate arrangements. At the same time, the connections between nozzles are all self-contained within the nozzle clusters and cap clusters.

It is applicants' intention to use the system as described, but it is contemplated that its use is not so restricted to fuel injection systems, but may be entirely suitable for carburetion in the conventional manner. The inlets to each of the branches are evenly spaced and open into a plain wall surface, so that fuel distribution with a carburetor arrangement would be satisfactory. Thus it would be possible by alternative fuel systems to determine by comparison the merits of one fuel system with respect to another by a simple interchanging of parts; in other words, the substitution of a carburetor for the air horn D.

A structure has been described which will fulfill all of the objects of the present invention, but it is contemplated that other modifications will occur to those skilled in the art which come within the scope of the invention as defined in the appended claims.

We claim:

1. An air induction system for a piston engine of the type having a row of spaced cylinders comprising, in combination, a plurality of ram tubes having inner open ends connected with the intake ports of the cylinders of said engine and extending from said engine in the same direction to outer open ends disposed a substantial distance from the intake ports of said engine cylinders, an air header connecting with said outer open ends and disposed lengthwise of said row of spaced cylinders of said engine, and upper and lower spaced walls in said header with spaced partitions therebetween for forming a substantial portion of the length of said ram tubes, and an air inlet for said air header.

2. An air induction system for a piston engine of the type having a row of spaced cylinders comprising, in combination, an air header disposed lengthwise of the row of spaced cylinders of said engine, an air inlet for said header and ram tube outlets for said header, a pair of spaced walls in said header, partitions extending between said spaced walls forming a substantial portion of a plurality of said ram tubes, said ram tubes having open ends connected with the intake ports of the cylinders of said engine, and spaced openings in one of said walls forming inlets for said ram tubes.

3. An air induction system for a piston engine of the type having cylinders arranged in a row comprising, in combination, a header located adjacent said cylinders and extending lengthwise of the cylinders of said engine, an air inlet for said header, an interior wall in said header spaced from one of the outer walls thereof, a plurality of partitions dividing the space between said walls into a plurality of individual ram tubes having open ends connected with the intake ports of the engine, and openings between each of said partitions leading to each of said ram tubes.

4. An air induction system for a piston engine of the type having parallel rows of cylinders comprising, in combination, a plurality of ram tubes having open ends connected alternately with the intake ports of the cylinders in opposite rows and extending from said engine in the same direction in side-by-side relation a substantial distance from the intake ports in each of said rows of engine cylinders, an air header disposed between said rows of cylinders, a substantially flat wall at the bottom of said air header, air outlets from said header arranged in said bottom wall adjacent each row of cylinders and forming the inlets for ram tubes connected with the opposite row of cylinders, and an air inlet for said air header.

5. An air induction system for a piston engine of the type having parallel rows of cylinders comprising, in combination, a header located between said parallel rows of cylinders, an air inlet for said header, an interior wall in said header spaced from one of the outer walls thereof, a plurality of partitions dividing the space between said walls into a plurality of individual ram tubes having open ends connected with the intake ports of the engine, and openings between each of said partitions leading to each of said ram tubes.

6. An air induction system for a piston engine of the type having parallel rows of cylinders comprising, in combination, a header located between said parallel rows of cylinders, an inlet for said header, a plurality of ram tubes arranged side-by-side within said header having open ends connected with the intake ports in alternate banks of the engine, and inlets at the opposite ends of said ram tubes facing in the same direction.

7. An air induction system for a piston engine of the type having parallel rows of cylinders comprising, in combination, a header located symmetrically between the parallel rows of cylinders below the engine valve covers and extending between the same to form a chamber of substantial width and length, an inlet for said header, and a series of ram tubes connected with the individual cylinders in each bank and extending diagonally of the engine in a lengthwise direction in side-by-side arrangement within said header, and inlets for said ram tubes arranged for each ram tube adjacent the opposite bank of cylinders whereby the tubes are of maximum length relative to the spacing between the rows of cylinders.

8. An air and fuel induction system for a piston engine of the type having a row of spaced cylinders comprising, in combination, an air header, an air inlet for said header, a plurality of ram tubes having their open ends connected with the intake ports of the cylinders and extending into said header, a plurality of fuel nozzles for injecting fuel adjacent the open ends of said ram tubes, and a nozzle cluster secured to said air header and said ram tubes for mounting said nozzles.

9. An air and fuel induction system for a piston engine of the type having a row of spaced cylinders comprising, in combination, a plurality of ram tubes having open ends connected with the intake ports of the cylinders of said engine, an air header, an air inlet for said header, a plurality of fuel nozzles for injecting fuel at the open ends of said ram tubes, a nozzle cluster secured to the ends of said ram tubes for supporting said nozzles, a plurality of fuel chambers in said nozzle cluster, fuel valves in said nozzles, diaphragms for operating said valves enclosing said fuel chambers in said nozzle cluster, and a cap cluster secured to said nozzle cluster and enclosing said diaphragms.

10. An air and fuel induction system for a piston engine of the type having a row of spaced cylinders comprising, in combination, a plurality of ram tubes having open ends connected with the intake ports of the cylinders of said engine and extending in the same direction, an air header, an air inlet for said air header, a plurality of fuel nozzles for injecting fuel at the open ends of said ram tubes, a nozzle cluster for supporting said nozzles, fuel chambers in said nozzle clusters, one for each nozzle, a fuel valve in said nozzle, a diaphragm for operating each fuel valve and sealing each of said chambers in said nozzle cluster, a cap cluster secured to said nozzle cluster and enclosing said diaphragms, means forming fuel chambers in said cap cluster registering with said diaphragms, and fuel passages in said nozzle cluster with individual connections to each of said fuel chambers enclosed by said diaphragms.

11. An air and fuel induction system for a piston engine of the type having a row of spaced cylinders comprising, in combination, a plurality of ram tubes having open ends connected with the intake ports of the cylinders of said engine and extending in the same direction, an air header, an air inlet for said air header, a plurality of fuel nozzles for injecting fuel into said ram tubes adjacent their open ends, a nozzle cluster having a plurality of fuel chambers for supporting said nozzles, diaphragms for operating said valves and sealing each of said fuel chambers in said nozzle cluster, a cap cluster having a plurality of fuel chambers registering with said diaphragms and secured to said nozzle cluster, a plurality of fuel passages individually and separately connecting each of the fuel chambers in said nozzle cluster, and a plurality of fuel connections in said cap cluster communicating with said fuel passages in said nozzle cluster.

12. An air and fuel induction system for a piston engine of the type having a row of spaced cylinders comprising, in combination, a plurality of ram tubes having open ends connected with the intake ports of said cylinders of said engine and extending in the same direction, an air header supplying air to said ram tubes, an air inlet for said air header, a plurality of fuel nozzles for injecting fuel at the open ends of said ram tubes, a nozzle cluster for supporting a plurality of said fuel nozzles, a plurality of fuel chambers in said nozzle cluster corresponding in number with the said nozzles, fuel valves in said nozzles, diaphragms for operating said fuel valves enclosing said fuel chambers in said nozzle cluster, a cap cluster, a plurality of fuel chambers in said cap cluster registering with said diaphragms, a plurality of fuel passages individually and separately connecting with said fuel chambers in said nozzle cluster, a plurality of connections on said cap cluster communicating with said separate passages, a plurality of passages interconnecting the fuel chambers in said cap cluster, and external connections on said cap cluster communicating with each of said fuel chambers in said cap cluster by way of said passages.

13. An air and fuel induction system for a piston engine of the type having parallel rows of cylinders comprising, in combination, a manifold including an air header located between said parallel rows of cylinders, an air inlet for said manifold, a plurality of ram tubes having open ends connected with the intake ports of each bank of cylinders and extending into said header in overlapping relation, fuel nozzles for discharging fuel at the open ends of said ram tubes, a nozzle cluster for each bank of cylinders mounted on said manifold and supporting said fuel nozzles, fuel chambers in said nozzle clusters, a valve for each of said nozzles, a diaphragm for operating each of said valves and enclosing each of said fuel chambers in each of said nozzle clusters, a cap cluster for each of said nozzle clusters, a plurality of fuel chambers in each cap cluster registering with each of said diaphragms, and means for securing said cap clusters on said nozzle clusters.

14. An induction system for a piston engine of the type having parallel rows of cylinders comprising, in combination, a manifold including an air header located between said parallel rows of cylinders, an air inlet for said manifold, a plurality of ram tubes having open ends connected with the intake ports in each bank of cylinders and extending into said header in overlapping relation, fuel nozzles discharging fuel at the open ends of said ram tubes, a pair of nozzle clusters, one for each engine bank, secured to said manifold and supporting said fuel nozzles, a plurality of fuel chambers in each nozzle cluster, a diaphragm for operating each fuel valve and secured in and closing each of said fuel chambers in each of said nozzle clusters, a cap cluster for each nozzle cluster, each cap cluster having a plurality of fuel chambers registering with said diaphragms and secured to each nozzle cluster, a plurality of individual and separate fuel passages in each of said nozzle clusters leading to each of the fuel chambers in each of said nozzle clusters, a plurality of separate inlet connections in said cap cluster connecting with each of said separate passages in said nozzle cluster, individual connecting passages between said fuel chambers in said cap cluster, and a plurality of inlet and outlet connections in said cap cluster leading to said fuel chambers therein.

15. An air induction system for a piston engine of the type having spaced cylinders comprising, in combination, a plurality of ram tubes having open ends connected with the intake ports of the cylinders of said engine and extending from said engine in side-by-side relation to ends disposed a substantial distance from the intake ports of the engine cylinders, an air header disposed on said engine, a substantially flat wall on the engine side of said air header extending along each of said ram tubes, and a plurality of openings in said flat wall forming individual inlets for said ram tubes, each of said inlets to said ram tubes being disposed a substantially equal distance from each of the inlet ports of said cylinders.

16. An induction system for a piston engine of the type having a row of spaced cylinders and intake ports for said cylinders, comprising, a plurality of ram tubes having outer open ends connecting with the intake ports for each cylinder, said ram tubes extending in the same direction a substantial distance from the intake ports of said engine and terminating in inlet ends for said ram tubes disposed equal distances from said outer open ends, an air header disposed lengthwise along the row of spaced cylinders of said engine and co-extensive with said ram tubes for a substantial portion of their length, spaced walls for said air header forming a chamber, an air inlet in one of said walls of said air header, and a plurality of spaced outlets in one of said walls of said header, said ram tubes extending along the wall with said spaced outlets and having said inlet ends of said ram tubes individually connected with said spaced outlets in said header.

17. An induction system for a piston engine of the type having a row of spaced cylinders and intake ports for said cylinders, comprising, a plurality of ram tubes having outer open ends connecting with the intake ports for each cylinder, said ram tubes extending in the same direction at an angle to the row of spaced cylinders for a substantial distance from the intake ports of said engine and terminating in inlet ends for said ram tubes disposed equal distances from said outer open ends, an air header disposed lengthwise along the row of spaced cylinders of said engine and co-extensive with said ram tubes for a substantial portion of their length, spaced walls for said air header forming a chamber, an air inlet in one of said walls of said air header, and a plurality of spaced outlets in one of said walls of said header, said ram tubes extending along said wall with the spaced outlets and having said inlet ends of said ram tubes individually connected with said spaced outlets in said header.

References Cited in the file of this patent

UNITED STATES PATENTS

| | | |
|---|---|---|
| 1,980,778 | Bachle | Nov. 13, 1934 |
| 2,810,620 | Goodridge | Aug. 6, 1957 |

FOREIGN PATENTS

| | | |
|---|---|---|
| 505,489 | Great Britain | May 11, 1939 |